(12) United States Patent
Jornitz et al.

(10) Patent No.: US 10,533,758 B2
(45) Date of Patent: Jan. 14, 2020

(54) MODULAR PARTS THAT SUPPLY UTILITIES TO CLEANROOM, ISOLATION OR CONTAINMENT CUBICLES, PODS, OR MODULES

(71) Applicant: G-CON MANUFACTURING INC., College Station, TX (US)

(72) Inventors: Maik Wolfgang Jornitz, Manorville, NY (US); Sidney Backstrom, College Station, TX (US); Troy Arledge, Gause, TX (US)

(73) Assignee: G-CON MANUFACTURING INC., College Station, TX (US)

( * ) Notice: Subject to any disclaimer, the term of this patent is extended or adjusted under 35 U.S.C. 154(b) by 287 days.

(21) Appl. No.: 14/796,739

(22) Filed: Jul. 10, 2015

(65) Prior Publication Data
US 2016/0010883 A1   Jan. 14, 2016

Related U.S. Application Data

(60) Provisional application No. 62/023,706, filed on Jul. 11, 2014.

(51) Int. Cl.
*F24F 3/16* (2006.01)
*E03C 1/02* (2006.01)
*F24F 13/32* (2006.01)

(52) U.S. Cl.
CPC ............... *F24F 3/16* (2013.01); *E03C 1/02* (2013.01); *F24F 13/32* (2013.01)

(58) Field of Classification Search
CPC ... F24F 3/16; F24F 3/161; F24F 13/32; F03C 1/02; E04H 5/00
(Continued)

(56) References Cited

U.S. PATENT DOCUMENTS

| 1,967,511 A | 7/1934 | Meyer |
| 2,156,859 A | 5/1939 | Lowe |

(Continued)

FOREIGN PATENT DOCUMENTS

| CN | 201281413 | 7/2009 |
| EP | 0400575 | 12/1990 |

(Continued)

OTHER PUBLICATIONS

Moldenhauer, Understanding Clanroom Classifications, Mar. 24, 2014, http://www.cemag.us/article/2014/03/understanding-cleanroom-classifications.*

(Continued)

*Primary Examiner* — Gregory L Huson
*Assistant Examiner* — Dana K Tighe
(74) *Attorney, Agent, or Firm* — Edwin S. Flores; Daniel J. Chalker; Chalker Flores, LLP

(57) ABSTRACT

The present invention includes a removable utility unit and/or removable utility room for providing one or more utilities to at least one of a controlled air, a sealable, a sterilizable, a sanitizable cleanroom comprising: at least one of a utility connection selected from air, water, gas, or electricity; and a substantially hermetic connector between the removable unit and the cleanroom, wherein the at least one of air, water, gas, or electricity are connectable to matching utility inputs in the cleanroom.

24 Claims, 11 Drawing Sheets

(58) Field of Classification Search
USPC .................................................... 454/187
See application file for complete search history.

(56) References Cited

U.S. PATENT DOCUMENTS

| | | | |
|---|---|---|---|
| 2,793,067 A | 5/1957 | Couse | |
| 2,904,850 A | 9/1959 | Couse et al. | |
| 3,378,963 A | 4/1968 | Gyo | |
| 3,742,932 A | 7/1973 | Greenspan | |
| 3,766,844 A * | 10/1973 | Donnelly | F24F 3/1603 |
| | | | 135/116 |
| 4,255,912 A | 3/1981 | Kovacs | |
| 4,409,889 A | 10/1983 | Burleson | |
| 4,599,829 A | 7/1986 | DiMartino | |
| 4,633,626 A | 1/1987 | Freeman et al. | |
| 4,667,579 A | 5/1987 | Daw | |
| 4,667,580 A | 5/1987 | Wetzel | |
| 4,707,953 A | 11/1987 | Anderson et al. | |
| 4,739,597 A | 4/1988 | Voegeli et al. | |
| 4,779,514 A | 10/1988 | Prigmore et al. | |
| 4,850,268 A | 7/1989 | Saito et al. | |
| 4,915,435 A | 4/1990 | Levine | |
| 4,923,352 A | 5/1990 | Tamura et al. | |
| 5,125,203 A | 6/1992 | Daw | |
| 5,152,814 A | 10/1992 | Nelson | |
| 5,195,922 A | 3/1993 | Genco | |
| 5,319,904 A | 6/1994 | Pascoe | |
| 5,344,365 A | 9/1994 | Scott et al. | |
| 5,353,557 A | 10/1994 | Lerner et al. | |
| 5,412,913 A | 5/1995 | Daniels et al. | |
| 5,562,539 A | 10/1996 | Hashimoto et al. | |
| 5,656,491 A | 8/1997 | Cassani et al. | |
| 5,713,791 A | 2/1998 | Long et al. | |
| 5,735,639 A | 4/1998 | Payne et al. | |
| 5,904,005 A | 5/1999 | Dyer et al. | |
| 5,941,846 A | 8/1999 | Duffy et al. | |
| 5,964,065 A | 10/1999 | Migurski et al. | |
| 6,179,358 B1 | 1/2001 | Hirayama et al. | |
| 6,394,523 B1 | 5/2002 | Yoo et al. | |
| 6,512,384 B1 | 1/2003 | Lagowski et al. | |
| 6,634,149 B2 | 10/2003 | Cates et al. | |
| 6,849,100 B2 * | 2/2005 | Lim | F24F 3/161 |
| | | | 55/385.2 |
| 6,960,236 B1 | 11/2005 | Tamura et al. | |
| 6,969,102 B2 | 11/2005 | Orischak et al. | |
| 7,097,804 B2 * | 8/2006 | Frantz | B29D 23/006 |
| | | | 264/285 |
| 7,160,717 B2 | 1/2007 | Everett | |
| 7,162,833 B2 | 1/2007 | Faris | |
| 7,222,246 B2 | 5/2007 | Pomaranski et al. | |
| 7,272,733 B2 | 9/2007 | Pomaranski et al. | |
| 7,272,833 B2 | 9/2007 | Pomaranski et al. | |
| 7,326,355 B2 | 2/2008 | Graetz et al. | |
| 7,472,513 B2 | 1/2009 | Bula | |
| 7,511,960 B2 | 3/2009 | Hillis et al. | |
| 7,712,270 B2 | 5/2010 | Guevremont | |
| 7,794,001 B2 | 9/2010 | Blackwell et al. | |
| 7,861,102 B1 | 12/2010 | Ranganathan et al. | |
| 7,934,124 B2 | 4/2011 | Bechtolsheim et al. | |
| 7,985,382 B1 | 7/2011 | Henry et al. | |
| 8,042,562 B1 | 10/2011 | McDaniel, Jr. | |
| 8,061,080 B2 | 11/2011 | Loebl et al. | |
| 8,065,560 B1 | 11/2011 | Patil | |
| 8,147,301 B2 | 4/2012 | Ghattas | |
| 8,239,340 B2 | 8/2012 | Hanson | |
| 8,371,912 B2 | 2/2013 | Ozeki | |
| 8,479,038 B1 | 7/2013 | Patil | |
| 8,584,349 B2 | 11/2013 | Scannon et al. | |
| 2002/0174888 A1 | 11/2002 | Brown | |
| 2003/0140555 A1 | 7/2003 | Saether | |
| 2004/0194484 A1 | 10/2004 | Zou et al. | |
| 2005/0091916 A1 | 5/2005 | Faris | |
| 2005/0193643 A1 | 9/2005 | Pettus | |
| 2006/0107635 A1 * | 5/2006 | Homan | A61G 10/023 |
| | | | 55/385.2 |
| 2007/0089854 A1 | 4/2007 | Jaisinghani | |
| 2007/0130844 A1 | 6/2007 | Arts et al. | |
| 2007/0132262 A1 | 6/2007 | Sun et al. | |
| 2007/0167126 A1 | 7/2007 | Ghattas | |
| 2007/0251145 A1 | 11/2007 | Brusatore | |
| 2008/0302004 A1 | 12/2008 | Lin | |
| 2009/0122533 A1 | 5/2009 | Brukilacchio | |
| 2009/0199470 A1 | 8/2009 | Capen et al. | |
| 2009/0305626 A1 | 12/2009 | Hope | |
| 2010/0024352 A1 | 2/2010 | Pope | |
| 2010/0031564 A1 | 2/2010 | Loebl et al. | |
| 2010/0112926 A1 | 5/2010 | Ozeki | |
| 2011/0053486 A1 * | 3/2011 | Holtz | C12M 37/00 |
| | | | 454/187 |
| 2011/0116826 A1 * | 5/2011 | Nishikawa | G03G 21/206 |
| | | | 399/92 |
| 2011/0232543 A1 | 9/2011 | Burroughs et al. | |
| 2011/0258837 A1 | 10/2011 | Scannon | |
| 2012/0077429 A1 | 3/2012 | Wernimont et al. | |
| 2012/0099035 A1 | 4/2012 | Burgess | |
| 2012/0181869 A1 | 7/2012 | Chapel et al. | |
| 2014/0179216 A1 | 6/2014 | Walters | |

FOREIGN PATENT DOCUMENTS

| | | |
|---|---|---|
| EP | 940292 | 9/1999 |
| EP | 2098111 | 9/2009 |
| JP | 61101733 | 5/1986 |
| JP | 63-135736 | 8/1988 |
| JP | 05-106887 | 4/1993 |
| JP | 06-174279 | 6/1994 |
| JP | 06183511 | 7/1994 |
| JP | 10077711 | 3/1998 |
| JP | 2000142211 | 5/2000 |
| JP | 2001141274 | 5/2001 |
| JP | 2002221464 | 8/2002 |
| JP | 2002-332753 | 11/2002 |
| JP | 2004033498 | 2/2004 |
| JP | 2004233021 | 8/2004 |
| JP | 2007107779 | 4/2007 |
| JP | 2007107830 | 4/2007 |
| JP | 08-304989 | 12/2008 |
| JP | 2009002634 | 1/2009 |
| JP | 2002129666 A | 5/2009 |
| JP | 2011-185593 | 9/2011 |
| KR | 100675682 | 12/2006 |
| KR | 1020120054634 | 5/2012 |
| TW | 200912219 | 3/2009 |
| WO | 199626329 A1 | 8/1996 |
| WO | 00/02618 | 1/2000 |
| WO | 03/088886 A1 | 10/2003 |
| WO | 03/095765 | 11/2003 |
| WO | 04/005170 | 1/2004 |
| WO | 2004106669 A1 | 12/2004 |
| WO | 2007067656 | 6/2007 |
| WO | 08/018671 | 2/2008 |
| WO | 2011-022325 A2 | 2/2011 |
| WO | 2013132086 | 9/2013 |

OTHER PUBLICATIONS

Astra-Zeneca Pharmaceutical Building, Vanguard Modular Building Systems Brochure, Dec. 9, 2004, 2 pages.

Cleanroom Solutions, Starrco Brochure, 4 pages. Starrco Company, Inc.

HDW Series, "Hardwall Cleanroom", Abtech, Inc., p. 8.

Muth, Laboratory Design, "Modular Construction: Pros and Cons for the Lab Building," R&D Magazine, Jun. 17, 2009, 5 pages.

Pharmadule Press Release, "Pharmadule Doubles Production Capacity and Acquires Patent for Modular Biotech Plants," Sep. 27, 2002, 1 page, http://www.pharmadule.com/pharmadule-doubles-production-capacity-an . . . .

International Search Report, PCT/US2014/060505, dated Nov. 26, 2014.

Extended European Search Report 14853721.0 dated Sep. 30, 2016, 8 pp.

(56) References Cited

OTHER PUBLICATIONS

International Search Report and Written Opinion PCT/US2014/060505 dated Nov. 26, 2014.
International Search Report and Written Opinion PCT/US2015/040023 dated Jul. 10, 2015.
Extended European Search Report for EP 15819080.1 dated Mar. 22, 2018, 11 pp.

* cited by examiner

MODULAR PARTS THAT SUPPLY UTILITIES TO CLEANROOM, ISOLATION OR CONTAINMENT CUBICLES, PODS, OR MODULES

CROSS-REFERENCE TO RELATED APPLICATIONS

This application is a non-provisional application of U.S. Provisional Patent Application Ser. No. 62/023,706 filed on Jul. 11, 2014 and entitled "Modular Parts that Supply Utilities to Cleanroom, Isolation or Containment Cubicles, Pods, or Modules" the entire contents of which is incorporated herein by reference.

TECHNICAL FIELD OF THE INVENTION

The present invention relates in general to the field of biosafety units, and more particularly, to modular parts that connect to modular, self-contained, mobile rooms for the manufacture of products requiring clean rooms.

STATEMENT OF FEDERALLY FUNDED RESEARCH

None.

BACKGROUND OF THE INVENTION

Without limiting the scope of the invention, its background is described in connection with modular facilities.

U.S. Pat. No. 8,584,349, issued to Scannon, et al., is directed to a flexible manufacturing system. Briefly, these inventors teach a flexible, multi-product, multi-technology, expandable facility for manufacturing products, such as biologicals, pharmaceuticals, or chemicals, and manufacturing processes using elements of such a facility. Among other components, the manufacturing system includes a housing, at least one corridor extending within the housing, a core supplying two or more utilities, wherein at least two of the two or more utilities are selected from clean air, clean water, electricity, oxygen, and carbon dioxide, a first movable manufacturing bay disposed within the housing and positioned adjacent to the corridor and removably coupled to the core for receiving the utilities.

U.S. Pat. No. 5,656,491, issued to Cassani, et al., teaches a mobile-module plant for the development and the production of biotechnological products on a pilot scale. Briefly, the patent teaches a mobile-module plant for the development and the production of biotechnological products on a pilot scale comprising equipment for the production, separation, purification and finishing of said products and auxiliary equipment, wherein the plant consists of at least two mobile modules suitable for being connected together and integrated one with the other. Each of the mobile modules comprises a movable container. At least one of the movable containers is provided with a preselected own set of the equipment. At least one of the movable containers is aseptic.

SUMMARY OF THE INVENTION

In one embodiment the present invention includes a removable utility unit for providing one or more utilities to at least one of a controlled air, a sealable, a sterilizable, a sanitizable cleanroom comprising: at least one of a utility connection selected from air, water, gas, or electricity; and a substantially hermetic connector between the removable unit and the cleanroom, wherein the at least one of air, water, gas, or electricity are connectable to matching utility inputs in the cleanroom. In one aspect, the removable utility unit is at least one of sterilizable or sanitizable separate from the cleanroom. In another aspect, the air utility is provided by first and second air inputs connectable to two separate heating, ventilation, and air conditioning (HVAC) systems and first and second inputs into one or more air distribution ventilation shaft, wherein the air distribution ventilation shaft has one or more outlets that direct air into the cleanroom. In another aspect, the air utility includes one or more HVAC systems that further comprise one or more air filtration units that provide at least the air changes necessary to achieve Class A, B, C, D or CNC air purity. In another aspect, the air utility further comprises one or more sterilizing or sanitizing units. In another aspect, the air utility further comprises one or more sterilizing, sanitizing or both, units selected from a UV unit, an ozonation unit, a hydrogen peroxide, a nitric oxide, chlorine dioxide, a steam or a fog unit. In another aspect, the air utility further comprises a control panel connected to one or more sensors that detect at least one or biological, radiological, particle size or chemical contamination in the clean room. In another aspect, the water utility provides at least one or potable water, cold water, hot water, pharmaceutical water, water-for-injection or deionized water, fire suppression and even bag-in/bag-out filters. In another aspect, the hermetic connector attachment has a mechanical strength sufficient to permit positive air pressure within the cleanroom without dislodging the removable utility unit. In another aspect, when the removable utility unit and the cleanroom are connected the hermetic connector provides a containment or isolation system sufficient to isolate biosafety level 1, 2, 3, or 4 pathogens. In another aspect, the removable utility unit can be further adapted to connect to at least one of an isolation or containment cubicles, pods, modules and units like corridors, hallways, other cleanrooms or access structures.

In another embodiment, the present invention includes a method of providing one or more utilities to at least one of a controlled air, a sealable, a sterilizable, or a sanitizable cleanroom comprising: attaching a removable utility unit comprising at least one of a utility connection selected from air, water, gas, or electricity to a substantially hermetic connector between the removable unit and the cleanroom, wherein the at least one of air, water, gas, or electricity are connectable to matching utility inputs in the cleanroom. In one aspect, the removable utility unit is at least one of sterilizable, or sanitizable separate from the cleanroom. In another aspect, the air utility is provided by first and second air inputs connectable to two separate heating, ventilation, and air conditioning (HVAC) systems and first and second inputs into one or more air distribution ventilation shaft, wherein the air distribution ventilation shaft has one or more outlets that direct air into the cleanroom. In another aspect, the air utility includes one or more HVAC systems that further comprise one or more air filtration units that provide at least the air changes necessary to achieve Class A, B, C, D and CNC air purity. In another aspect, the air utility further comprises a control panel connected to one or more sterilizing or sanitizing units. In another aspect, the air utility further comprises one or more sterilizing units selected from a UV unit, an ozonation unit, a hydrogen peroxide, nitric oxide, chlorine dioxide, a steam or a fog unit. In another aspect, the air utility further comprises one or more sensors that detect at least one or biological, radiological, particle size or chemical contamination. In another aspect, the water utility provides at least one or potable water, cold water, hot water, pharmaceutical water, water-for-injection or deionized water. In another aspect, the hermetic connector attachment has a mechanical strength sufficient to permit positive air pressure within the cleanroom without dislodging the removable utility unit. In another aspect, when the removable utility unit and the cleanroom are connected the hermetic connector provides a containment or isolation system sufficient to isolate biosafety level 1, 2, 3, or 4 pathogens. In another aspect, the removable utility unit can be further adapted to connect to at least one of an isolation or containment cubicles, pods, modules and units like corridors, hallways, other cleanrooms or access structures.

Yet another embodiment of the present invention includes a biological processing plant comprising: two or more cleanrooms connected to each other, wherein each of the cleanrooms further comprises a removable utility unit for providing one or more utilities to a controlled air, sealable, sterilizable cleanroom comprising: at least one of a utility connection selected from air, water, gas, or electricity; and a substantially hermetic connector between the removable unit and the cleanroom, wherein the at least one of air, water, gas, or electricity are connectable to matching utility inputs in the cleanroom.

Yet another embodiment of the present invention includes a removable utility room for providing one or more utilities to at least one of a controlled air, a sealable, a sterilizable, a sanitizable cleanroom through a removable utility unit comprising: at least one of a utility connection selected from air, water, gas, or electricity; and a substantially hermetic connector between the removable utility room, the removable utility unit and the cleanroom, wherein the at least one of air, water, gas, or electricity are connectable to matching utility inputs in the cleanroom from the removable utility room. In one aspect, the removable utility room is at least one of sterilizable or sanitizable separate from the cleanroom. In another aspect, the removable utility room includes at least two separate heating, ventilation, and air conditioning (HVAC) systems and first and second inputs into one or more air distribution ventilation shaft, wherein the air distribution ventilation shaft has one or more outlets that direct air into the cleanroom. In another aspect, the removable utility room includes one or more HVAC systems that further comprise one or more air filtration units that provide at least the air changes necessary to achieve Class A, B, C, D or CNC air purity. In another aspect, the removable utility room further comprises one or more sterilizing or sanitizing units. In another aspect, the removable utility room further comprises one or more sterilizing, sanitizing or both, units selected from a UV unit, an ozonation unit, a hydrogen peroxide, a nitric oxide, chlorine dioxide, a steam or a fog unit. In another aspect, the removable utility room further comprises a control panel connected to one or more sensors that detect at least one or biological, radiological, particle size or chemical contamination.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Figure 1:
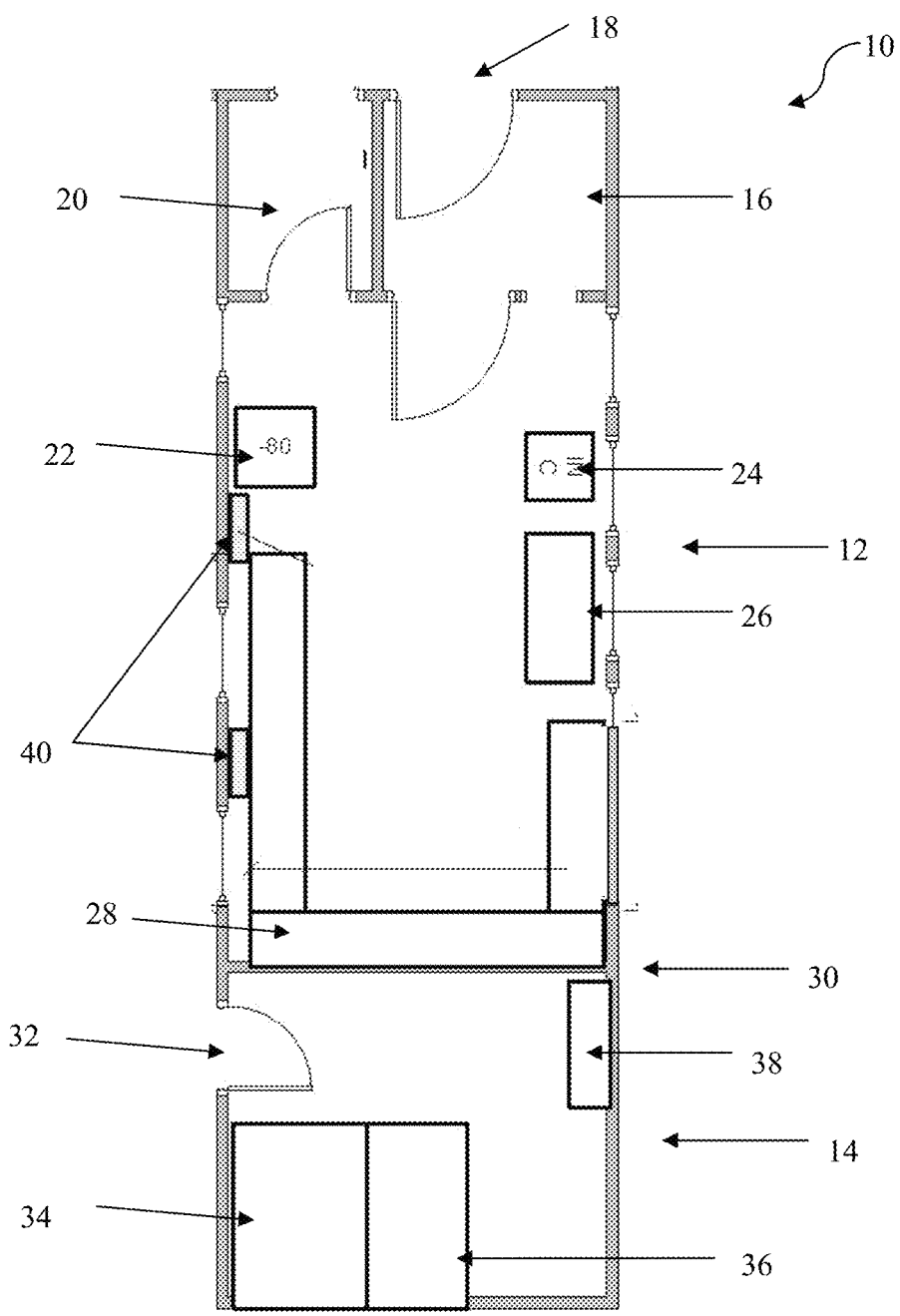
FIG. 1 is a top view of a modular unit of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention includes a modular facility for the production of, e.g., pharmaceuticals, vaccines, monoclonal antibodies and protein therapeutics, semiconductors, or biomechanical devices and includes all the necessary quality control, quality assurance, and lot release functions. The end product can be made within the same or an adjacent module filled in bulk vials, suitable for distribution, and compliant with all FDA current Good Manufacturing Practices (cGMP) guidelines. The following terms are used interchangeably "modular unit", "structure", "unit" or "module" to describe a unitary structure that includes at least one portion that is a sealable, working area or cleanroom in which one or more functions or processes are conducted that require a controlled working environment and a mechanical service room or area (which may be closed or open) and that support the clean room and provides redundant services to the cleanroom, e.g., air-handling, electrical, water, waste water, waste disposal, chiller and/or heated water, gas, control units and sensors, security. These services will generally be connected to a source of the service that uses universal connectors, which are those commonly used as fittings in industry (e.g., 110 or 220 volt connections, ½-1 inch liquid or gas connections, wired or wireless connections to an intra, extra or internet and the like).

As used herein the terms "validation" and "pre-validation" are intended to encompass all documented processes or acts undertaken to demonstrate that a procedure, a process or an activity will consistently yield an expected result or outcome. Validation often includes qualification of equipment and systems. Validation is a key required component of Good Manufacturing Practices (GMP) and other regulatory requirements. For example, in the pharmaceutical industry validation of a facility and the process is done prior to obtaining a regulatory approval for the commercial manufacture and sale of the pharmaceutical product. Validation activities in the pharmaceutical industry may also include trial runs (pre-validation) before performing the actual validation to set validation limits, critical manufacturing controls, alert limits, etc. and to assess the potential outcome of the actual validation run. Validations routinely performed in the cleaning validations, process validation, analytical method validation, computer system validation, qualifying systems and equipment including: design qualification (DQ), component qualification (CQ), installation qualification (IQ), operational qualification (OQ), and performance qualification (PQ).

The skilled artisan will recognize that though the structures, facilities or units described in the instant invention are validatable, they may not be validated or required to be validated for certain uses and applications, particularly for non-human use or manufacture of products for non-human consumption (for e.g. veterinary applications, agriculture applications, pesticide manufacture, etc.).

Each modular unit, whether operating alone, in a suit or as part of multiple-modular unit facility, can include specific enclosed spaces for the manufacture, fermentation, growth (e.g., in a bioreactor) of the composition requiring an FDA approved, GMP or cGMP facility. The facility can include controlled GMP areas and equipment consistent with USDA, CDC, FDA or regulations for foreign equivalents, including clean room conditions, purification, chromatography, bulk or individual vial filling, that can be arranged within, e.g., a standard factory or facility with a clearance sufficiently high to accommodate the units within. In one example, the modular units can be placed within a building shell that includes standard electrical connections, water, wastewater, air handling to which the units are connected. The present invention requires no pre-assembly or re-assembly of the multiple units as each can function independently and can be used for multiple purposes.

For example, a complete manufacturing facility can be built, within hours to days, from pre-assembled, pre-approved modular units that include all the equipment necessary for the desired function(s) for that unit within a manufacturing plant. These flexible-by-design GMP modular units allow for the design of production facilities for the rapid deployment and re-deployment of units based on the need. For example, one modular unit may include a self-contained bioreactor, the necessary liquid handling devices, refrigerators, tissue culture hoods and microbiology testing equipment, basic laboratory equipment (pipettors, sterile pipette tips, growth media, petri dishes, incubators and other general lab supplies), that has been tested and prevalidated to be compliant with the cGMPs or other regulatory body compliance requirements or in compliance with applicable codes, statutes, ordinances, regulations or equivalents. The term "pre-validated" as used herein refers to a facility that will meet or exceed the requirements for manufacturing of a particular industry. For example, a facility that is pre-validated for pharmaceutical manufacture of sterile or aseptic materials will meet, prior to deployment, the guidelines for manufacturing those products on a country (e.g., the United States Food and Drug Administration (FDA) Guidelines) or regional requirements (like the European Union). The skilled artisan will recognize that validation of a pharmaceutical manufacturing facility will meet or exceed the current Good Manufacturing Practices (cGMP) at the time of manufacture. For example, in the United States, the FDA has provided Guidance For Industry, which is available at www.fda.gov, and which can change from time to time. Regardless, the skilled artisan will know to seek the latest guidance for cGMP, follow the checklist and audit requirements for the then applicable guidance, and be able to pre-validate the facility and components thereof such that, upon inspection, the facility, unit or module, will meet or exceed the requirements for cGMP, or equivalent. One non-limiting example of Guidance is the Guidance for Industry—Sterile Drug Products Produced by Aseptic Processing—Current Good Manufacturing Practice of September 2004, the entire contents of which is incorporated herein by reference. A modular unit for protein isolation, adjacent to but completely independent from the bioreactor unit, can be positioned and in communication with the bioreactor unit such that the materials manufactured in the bioreactor are rapidly and easily transferred to the protein isolation unit that has, pre-approved and validated protein separation units, e.g., centrifuges, liquid chromatography columns, spectrophotometers, polyacrylamide gel electrophoresis (PAGE) units and bulk packaging units. Next, the bulk protein may be transferred to a packaging modular unit that includes all the equipment necessary to fill individual doses of the protein, small molecule or other agent that is being manufactured.

Furthermore, the use of individual modules provides for the rapid exchange and continuous manufacture of product in case that one part of the manufacturing process must be changed or revalidated (e.g., in the case of the manufacture of a different biological or the detection of contamination) without the need to re-certify the entire facility. The addition of more modular units also allows for very rapid scale-up that can be customized for short periods of time. For example, a plant can receive additional modular units for scaling-up in a short period of time for the manufacture and isolation of a vaccine and then those units may be redeployed elsewhere upon completion of the production run. In fact, the present invention can be used in existing manufacturing facilities for short-term expansion of manufacturing capacity without the need for revalidation of the new manufacturing capacity or the expensive, long-term installation of an additional production line that will only be used for a short period of time.

The modular units of the present invention can be used as stand-alone facilities (provided they contain all the necessary equipment to manufacture, isolate and package) or may be placed within an existing structure. One example of such a structure is an empty warehouse or building. One such building could be of standard, pre-cast concrete construction, flat slab with flat, smooth floors, concrete tilt wall, double T precast ceiling and having steel or other walls (which can also be epoxy coated for cleanability). Within the building, the modular units provide the dedicated wet laboratory, growth, bioprocess and purification units necessary for manufacture. These units are simply lifted into position (e.g., pushed on air bearings, casters, or pallets), and connected to a power source and, if necessary, other utility needs like chilled water, water and/or a wastewater supply.

The present invention allows the designer to have the ability to connect one functioning modular unit to one or more additional functioning modules without disrupting the function or compliance of the original modular unit(s). For example, automated pressure controls can be positioned such that adjacent modules immediately balance each other and/or retain a pressure cascade. Furthermore, the designer also has the ability to disconnect one functioning module from the area or corridor without disrupting the function or compliance of the original modular unit(s).

Yet another design option for the modular units of the present invention is the addition of an efficient energy recovery system that allows for energy recapture at a rate much higher than can be expected with existing methods. In this embodiment, the modular unit can also be connected to the central HVAC system of the building that houses the modular units. The intake and exhaust of the redundant HVAC systems of the modular units can be connected to the central HVAC of the building thereby enhancing the energy efficiency of both units. For example, the modular units of the present invention can be placed inside of a second environment (a building with ambient temperature or less humidity), which having the modular unit interact dynamically with that second environment. In this manner of operation, the modular unit can use ambient air that does not need to be treated by a large and expensive external air handling unit.

Another vast improvement over existing designs is the ability of the modular units to service multiple clients with a single cluster of modular units. For example, a biotechnology research park or similar entrepreneurial facility could host various different companies, each having their own production facility or modular unit. One distinct advantage of using the modular units is that each completely self-contained modular unit can contain an individual hazardous waste, spills, etc., without affecting any other structures (within a process flow or affecting an adjacent production facility, e.g., when a facility has various manufacturing lines or different companies).

When the modular unit needs to be connected to a source of water, the incoming water could be purified in an adjacent modular unit that could service various different production lines or the module itself could include a water purification unit. The modular unit of the present invention has the advantage that the redundant air handling units, electrical panels and even the water filtration units can be in the portion of the modular unit that is adjacent the clean room and can be serviced without service personnel having to enter the clean room area. When handling wastewater, the modular include can include sump pumps to eliminate waste. Furthermore, the bag in/bag out filters connected to the air handling units can also be changed without the need to enter the cleanroom area. These externally accessible portions of the buildings, or bays, allow for maintenance and maintenance personnel to service the unit without the need to gown-up and enter the clean room area.

Duplicate processes and equipment for air handling, exhaust, etc., with automatic fault tolerance/failover allows the user, e.g., from an external panel or via the internet, to switch-over from a first system to a second system if sensors within the modular unit sense a problem with a component in the first system or as part of regular maintenance.

Another feature of the modular units of the present invention is the ability to use connection devices that are well-known to maintenance personnel. For example, the modular units can use standard quick connectors for chilled water, electricity, etc. that allow the user to 'hot swap' the modular units externally. One advantage of the present invention is that it can take advantage of existing building infrastructure, e.g., mechanical equipment such as boilers, clean steam generator and compressors that can easily be connected to the units. The building's existing maintenance facilities and personnel serve to maintain services and cGMP equipment and environmental service compliance from outside the modular unit.

The present invention also includes a comprehensive management system that provides for the monitoring and maintenance of the module including electricity, water, fire, security, video, etc. externally.

The modular units of the present invention can be made from, for example, a welded aluminum frame, with an all-aluminum wall structure of materials and coatings that are cleanable in the drug production environment and are compliant with the cGMP's as described by the USDA, CDC, FDA or equivalent regulatory agency. Stainless steel fixtures and surfaces may also be used when necessary, but could add more weight to the unit if a weight limit exists. The HVAC system can be divide the suite into four zones: a service hallway that will be a controlled non-classified space, gowning room and de-gowning rooms that will be classified at Class 10,000 (ISO 7) and a processing area that will can be classified at Class 10, 100, 1000, 10,000 or higher depending on the requirement. Within the modular unit, the appropriate pressure cascade of at least 0.035 inches of water column is created by adjusting the inlet and exhaust fan output and adjusting the return air volume in each space. For example, pressure changes are often made between the process area and gowning rooms, and gowning rooms to hallway. Exit air filtration can be provided by a "bag in/bag out" HEPA or ULPA filtration module. Incoming air will be pre-filtered with a series of pleated filters integral to the air handler, which can be changed externally from the clean room. Floors can be, e.g., monolithic epoxy, and ceilings can used non-shed 2×4 ceiling tiles along with the requisite fan powered HEPA filters.

The environment of the modular unit, e.g., within the clean room portion of the modular unit or even the maintenance portion of the modular unit, can be controlled and monitored externally using standard network information systems and remote systems monitoring. All instrumentation and process equipment, where appropriate, will also have data interfaces installed on-site and remote data collection and will be internet protocol (IP) addressable.

The modular units will be equipped to easily interface with services such as a single electrical hook-up, chilled water supply, external gas supply, compressed air and liquid nitrogen if necessary to the process. Moreover, modular units can be outfitted with air bearings, so that the modular units can be moved easily to other areas to be reconfigured in near real time to support necessary processes and surge capabilities without disturbing ongoing operations.

Each modular unit can be preassembled with a final documentation package that can include: the design, structural, mechanical, electrical and plumbing drawings, system dossiers, installation qualification and operational qualification plan and executed documents, maintenance logs, and pro-forma quality assurance documents including basic standard operating procedures. These may be provided in hard copy, or provided via a display panel within the modular unit or externally (including within the maintenance bay) that is electronic and can include the necessary passcode/password protection. In fact, the entire unit can include safety features such as passcode/password protection to enter the clean room and/or the maintenance bay, the systems within the clean room (e.g., all the equipment within the room, e.g., bioreactors, columns, centrifuges, computers, assembly lines, input/output lines (liquid, solid, gas), electronic connections (including hard-wire and wireless connections), data storage, liquid and sample storage, storage of controlled substances (including safes or storage cages), incubators, refrigerators or freezers, −70° or other low temperature storage and entry or access to laboratory equipment and supplies.

GENERAL: The redundant HVAC system can include two or more 100% redundant air systems, each having an air handler with discharge air damper, exhaust fan with discharge air damper, and/or an electric duct heater. In operation, the HVAC system can include: a Building Automation System (BAS) that can start/stop the HVAC (and other) equipment electronically or mechanically. An air system that can be "ON" continuously (e.g., have instantaneous failover between systems, including a continuously operating "unoccupied" mode). A Lead and Lag systems can be rotated based on need, e.g., weekly or monthly. The air system can include one or more dampers, end switch closes; lag system exhaust fan discharge and air damper controllers; fan discharge switches; valve control and even duct heater controls.

SUPPLY FAN CONTROL: The constant speed supply fans can be operated from within the clean room, remote automatic start/stop switches, and /or a Building Automation System (BAS) to monitor, e.g., fan status. If the Lead supply fan stops for any reason, the Lead air system will be stopped per the air system stop command and, optionally, an auditory, visual, and/or silent alarm.

TEMPERATURE CONTROL: Temperature in the unit can be controlled via the air handling unit and/or a chilled-water (CHW) valve that modulates to control coil leaving air temperature and/or control of the temperature in the clean room, gown or de-gowning room and/or the maintenance room. The system may also include a duct heater that can modulate to control space temperature.

EXHAUST FAN CONTROL: The constant speed exhaust fans will be capable of remote automatic start/stop and can be monitored via the BAS, which monitors fan status. If the fan(s) stop for any reason, the air handling system will be stopped, and an alarm will be sent to the BAS and the redundant unit will immediate begin operating.

CHILLED WATER SYSTEM CONTROL: The chilled water system will be capable of remote automatic start/stop. The chilled water system will be enabled whenever the air-handling unit (AHU) entering air temperature is above the chilled water coil discharge air setpoint temperature. On a system start command, the CHW pump will start and the chiller controls will be enabled; the chiller will start when flow is proved. On a system stop command, the chiller will be disabled, and the pump will continue to run for five minutes and then be stopped. The BAS will monitor pump status. If the pump fails, the chiller will be disabled, and an alarm will be sent to the BAS. The BAS will monitor chiller status and can provide instantaneous fail-over capability by automatically switching to a redundant chiller. If the chiller fails, the pump will be stopped five minutes later, and an alarm will be sent by the BAS.

ADDITIONAL MONITORING POINTS AND SYSTEM ALARMS: Space pressure can be monitored, e.g., the pressure in the cleanroom. If the pressure drops to 0.0" water column (WC) or below, an alarm can be sent to the BAS. A variety of pressure sensors mounted in the modular unit (e.g., one in the corridor, one each in both the gowning rooms and one in the main lab area of the modular unit) can be provided and monitored. When an alarm is sent to the BAS, the system can call pre-programmed emergency telephone numbers and/or communication electronically via text or email.

Additional Points that can be monitored in the modular unit include, e.g., a static pressure blowout sensor in communication with the air handling units (AHU's) For example, the BAS can determine if there is a belt failure in either of the AHU's or EF's by using, e.g., an amp sensor that monitors the change in amp draw on the motor. Another sensor can be a pitot tube in the supply air duct and exhaust air duct that monitors static pressure connected to the BAS. Also, gravity dampers, automatic dampers and damper end switches and the controls can also be connected to and monitored by the BAS.

FIG. 1 shows a modular unit 10. The modular units can be made from, for example, a welded aluminum frame, with an all-aluminum wall structure of materials and coatings that are cleanable in the drug production environment and are compliant with the cGMP's as described by the USDA, CDC, FDA or equivalent regulatory agency. The modular unit ten includes two parts, a clean room 12 and a maintenance room 14. The clean room 12 includes a gowning room 16, which provides in this example the sole entry point 18 to the clean room 12, and a de-gowning room 20. In this configuration, the clan room 12 includes a −80° C. freezer 22, an incubator 24, a biosafety cabinet 26 and cabinetry 28, which is pre-installed in this configuration of the clean room 12. The −80° C. freezer 22, an incubator 24, a biosafety cabinet 26 and cabinetry 28 can be attached to the walls and floor by pre-installed attachment points that may be positioned throughout the interior of the clean room 12, or may be custom installed. The maintenance room 14 is separated from the clean room 12 by a wall 30 that isolates the clean room 12 from the maintenance room 14. The maintenance room 14 has a single point of entry 32, through which maintenance personnel can attend to the physical plant portions of the modular unit 10 without needing to access the clean room 12. All the wiring, plumbing and air conduits of the modular unit (not depicted), are pre-installed in the walls of the modular unit are sealed such that the clean room 12 is isolated from the environment surrounding the clean room 12. A redundant HVAC system 34 is found in the maintenance room 14 and can include a bag-in/bag-out filtration system 36. Electrical box 38 is found within the maintenance room 14 and can include not only an electrical panel/breaker box for the modular unit 10, but may also include wired and/or wireless communications equipment. In this example, the return air ducts 40 are positioned in the floor of the clean room and return via a sealed duct to the HVAC system 34.

Figure 2:
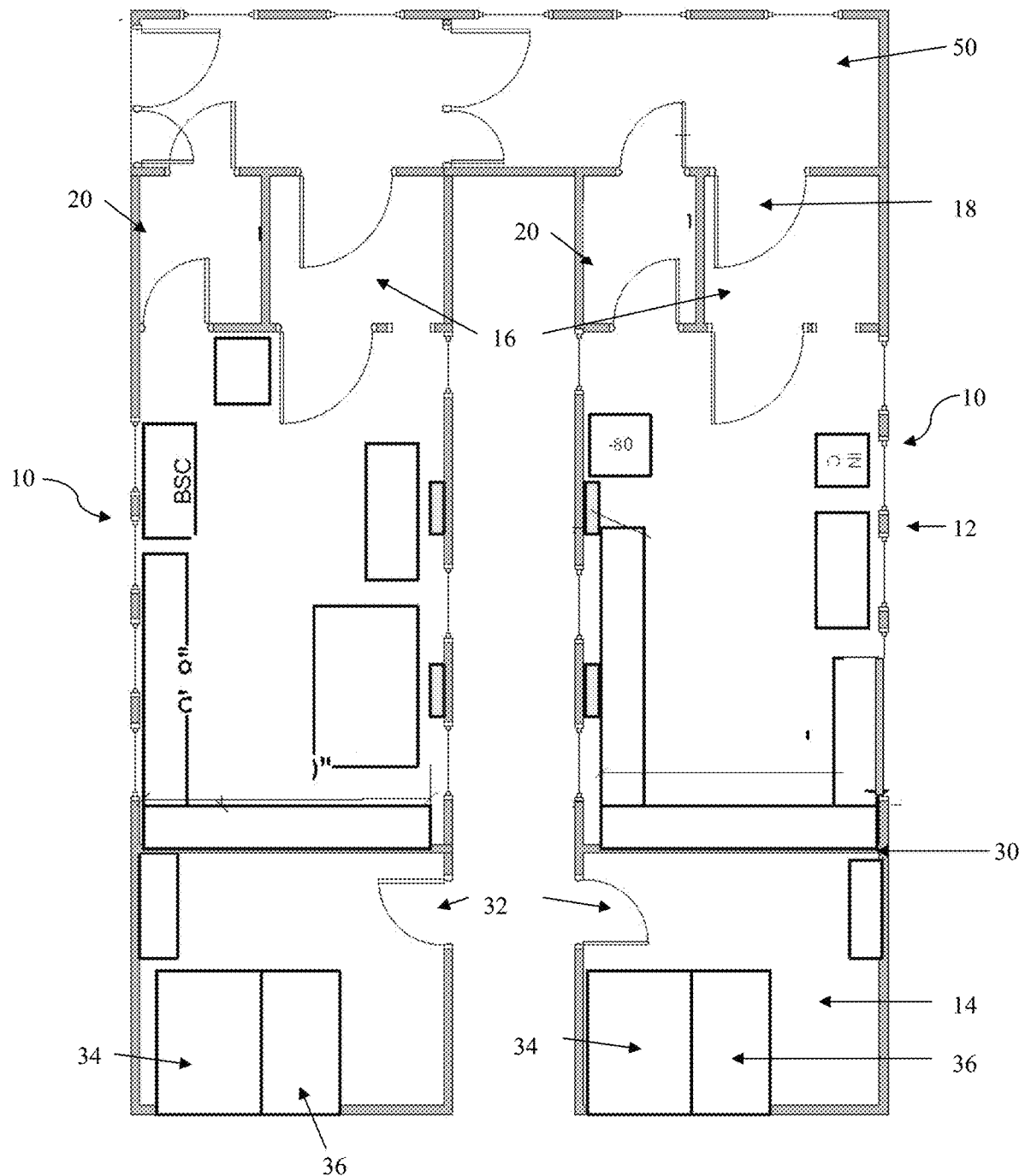
FIG. 2 is a top view of a pair of modular units of the present invention.
Figure 3:
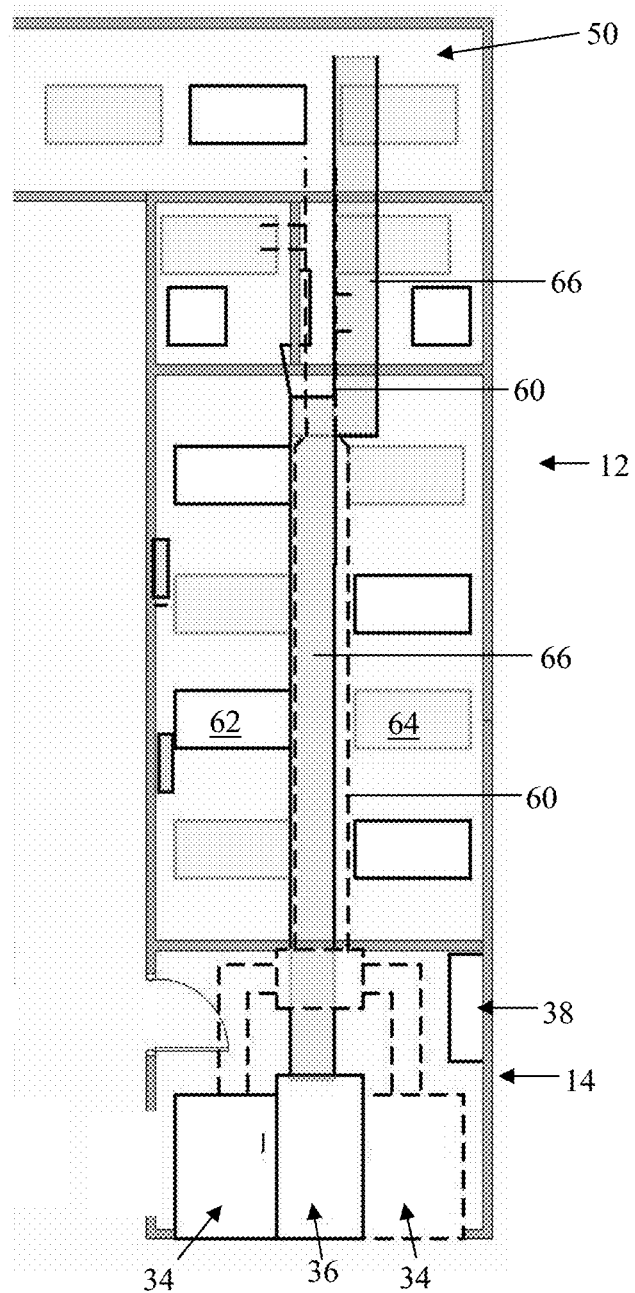
FIG. 3 is a top view of another pair of modular units of the present invention.

In the configuration depicted in FIGS. 2 and 3, two modular units 10 are shown and can be connected via a service hallway 50, which can be a controlled space, gowning room and de-gowning rooms that will be classified at Class 10,000 (ISO 7) and a processing area that will can be classified at Class 10, 100, 1000, 10,000 or higher depending on the requirement.

Figure 4:
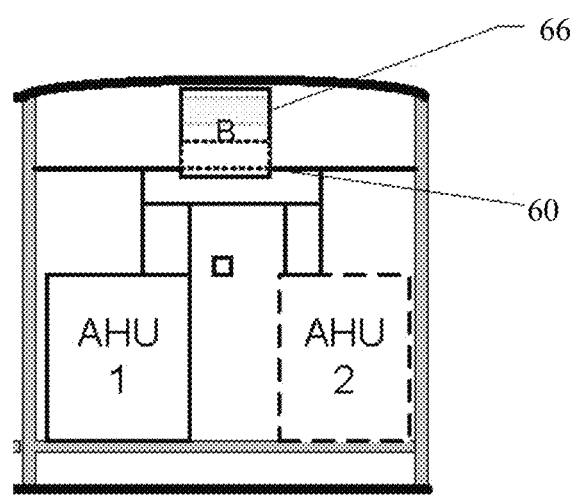
FIG. 4 is an end-view without the exterior wall of a modular unit of the present invention.

FIGS. 2 and 3 show two modular units 10, with a service hallway 50 and the details of an air conduit and filtration system connected to the air handling units 60 (see FIG. 3). Within the modular unit 10, the appropriate pressure cascade of at least 0.035 inches of water column is created within the conduits 60 by the use of changes in conduit size and/or baffles and return ducts 66. For example, pressure changes are often made between the process area and gowning room 16, and de-gowning room 20 to hallway 50 (see FIG. 2). Exit filtration will be provided by a "bag in/bag out" HEPA or ULPA filtration 36, a control panel 38, and HEPA filters 62, which alternate with lighting fixtures 64. Incoming air may be pre-filtered with a series of pleated filters integral to the air handler system 24, which can be changed externally from the clean room 12. Floors can be, e.g., monolithic epoxy, and ceilings can used non-shed 2×4 ceiling tiles along with the requisite fan powered HEPA filters. FIG. 4 shows a ground level end-view (with the exterior wall removed) in which the conduits 60 are shown in relation to return ducts 66.

The present invention includes one or more of the following sensors and, optionally, electronic reporting units that report, in real-time or based on a pre-determined or programmable schedule, wherein the sensors can report on the status of the various areas or systems of the modular units, including: Room temperature (degrees C. or F); Room relative humidity; Four Pressure sensors (e.g., 1 in the corridor, 1 in gown-in area, 1 in gown-out area, 1 in lab/cleanroom); Ambient air temperature (degrees C. or F); Ambient relative humidity; HEPA filter lifecycle status (e.g., measured in inches e.g.); Chilled water temperature (degrees C. or F); Chilled water pressure (psi); Supply fan status (2 each); Exhaust fan status (2 each); Chilled water status (degrees C. or F); Chilled water supply and return temperature (degrees C. or F); Chilled water pump status or various sensors to read status and performance on: temperature, $CO_2$, airflow, off/on, security, door position, personnel entry and exit, inventory control.

Hardened for harsh environments: The structure and portability of the cleanrooms provide for use as a facility hardened for harsh environments. As described previously herein the cleanroom can even be used as a stand-alone unit or can be combined with other modules that may serve as support units, such as a unit to contain chiller equipment, and/or a unit to contain mechanical equipment (such as a generator set, a compressor, and/or water containment and or purification equipment).

Hospital/Surgical/Triage: The structure, portability, and controlled environment of the cleanrooms provides for use as a hospital unit or units, surgical suite or suites, and/or triage facilities for areas in which there is otherwise no available infrastructure for such facilities or in areas in which such facilities have been recently destroyed, or in areas in which additional facilities are required before one can be constructed. The controllability of the interior environment and ability to create a Class 100 or Class 1000 compliant environment would be suitable for a burn unit, where patients are at particular risk for infection from exposure to airborne microbes.

Massively portable: The units described herein are compact enough to be transported via various modes, including but not limited to road, train, sea, and air. Units may be placed on a flatbed trailer pulled by a semi, sealed in shipping containers for rail or sea transport, or placed upon an air carrier, such as a Boeing C-17 Globemaster III military transport plane. A set-up like this could also be quickly dismantled and removed. Units are designed and engineered to withstand the physical stress of travel via road, train, sea, and air and are of a weight such as to be portable via these transportation means. The units of the present invention are built with structural lifting points such that they can be lifted via hydraulic lifts inserted into these points to be raised to above the level of a flat-bed trailer or higher. The flat-bed trailer is then backed under the unit and lowered and secured for transport.

Designed for maximal cleanability: As cleanability is crucial for the aseptic environment provided by the cleanrooms, floors, windows, and walls are made in such a way as to reduce, if not completely eliminate, cracks, crevices, joint spaces and other areas in which dust and microbes may rest or accumulate. Windows are flush-mounted to the interior to reduce small areas in which dust and microbes may accumulate and to increase to ease of cleaning of the joint at which a window meets a wall. Floors are covered with a monolithic application of an epoxy resin. Walls are likewise covered with a monolithic application of an epoxy resin. This creates increased cleanability of both wall and floor surfaces, but more importantly, reduces joint and cracks within both the wall and floor surfaces themselves, as well as eliminating a joint and or crack where wall meets floor.

Cleanrooms are constructed in multiple dimensions, including 12 feet by 43 feet, 15 feet by 43 feet, and 18 feet by 43 feet. Height may be from 10 feet to 18 feet. Lengths may be adjusted as required below 43 feet. These dimensions allow for ultimate flexibility in both use and transport. 12-foot-wide units are most applicable for air and sea transport, while road transport allows for up to 18 feet in width. Height may be increased to 18 feet to allow for the installation of larger equipment, such as large bioreactors that require such headroom.

Figure 5:
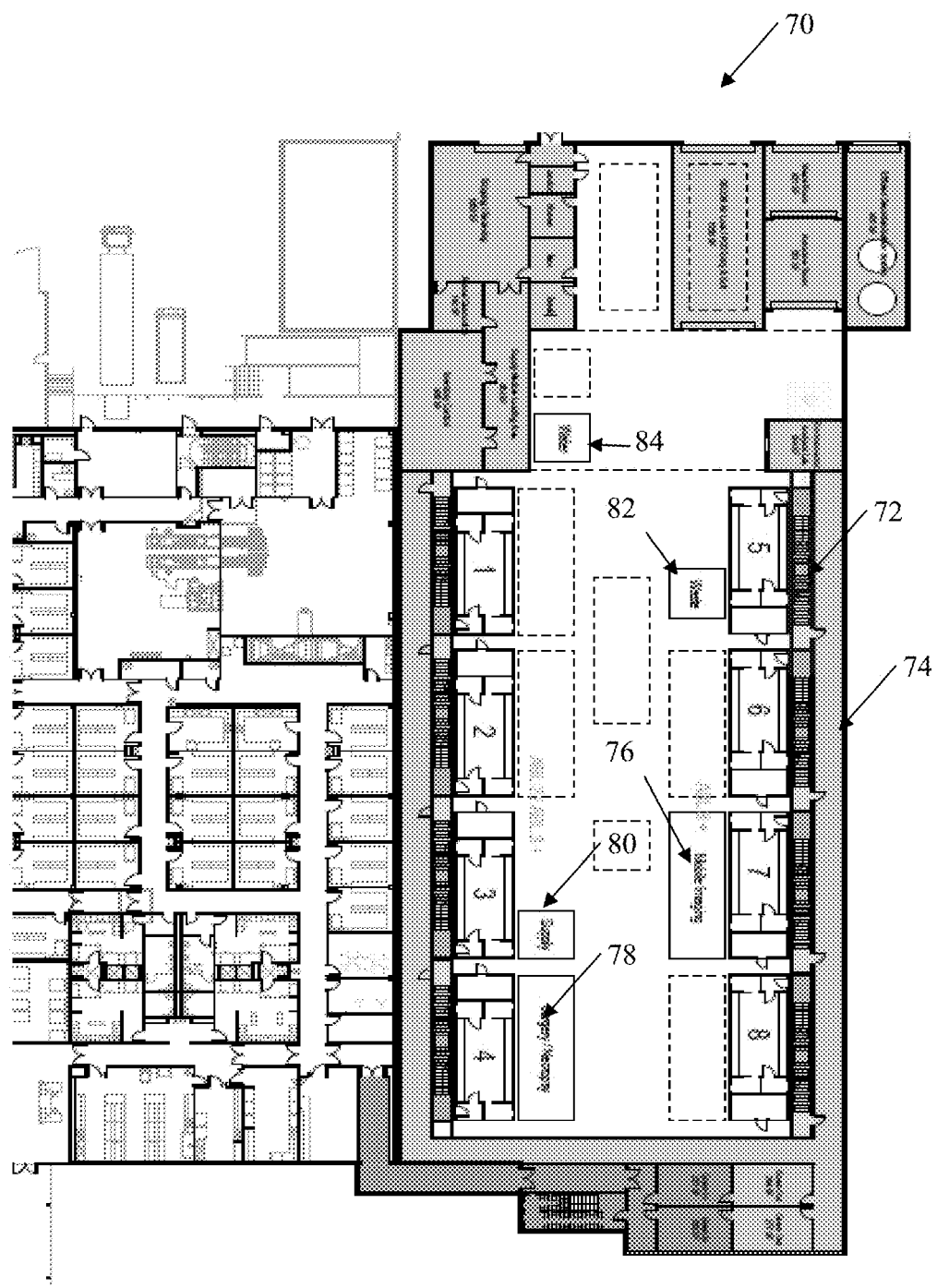
FIG. 5 is a top view of a complete, comprehensive manufacturing facility that includes manufacturing, processing, packaging, supplies/storage areas, quality control areas, maintenance, decontamination, controlled corridors, finishing and filling pods, locker rooms, mechanical, electrical and other maintenance areas, with some or all being of a modular.
Figure 6:
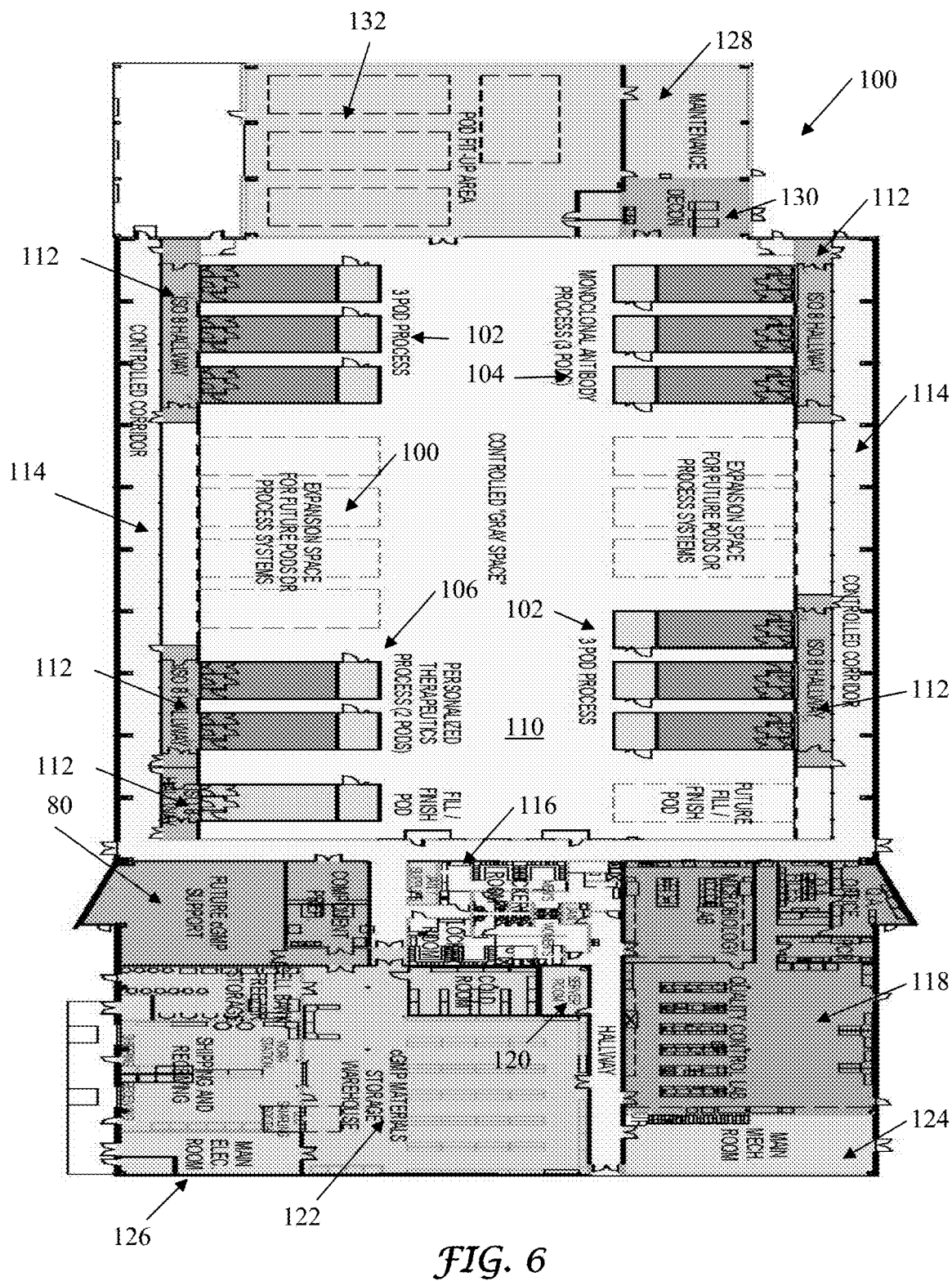
FIG. 6 is another top view of a complete, comprehensive biotherapeutics manufacturing facility that includes manufacturing, processing, packaging, supplies/storage areas, quality control areas, maintenance, decontamination, controlled corridors, finishing and filling pods, locker rooms, mechanical, electrical and other maintenance areas, with some or all being of a modular.
Figure 7:
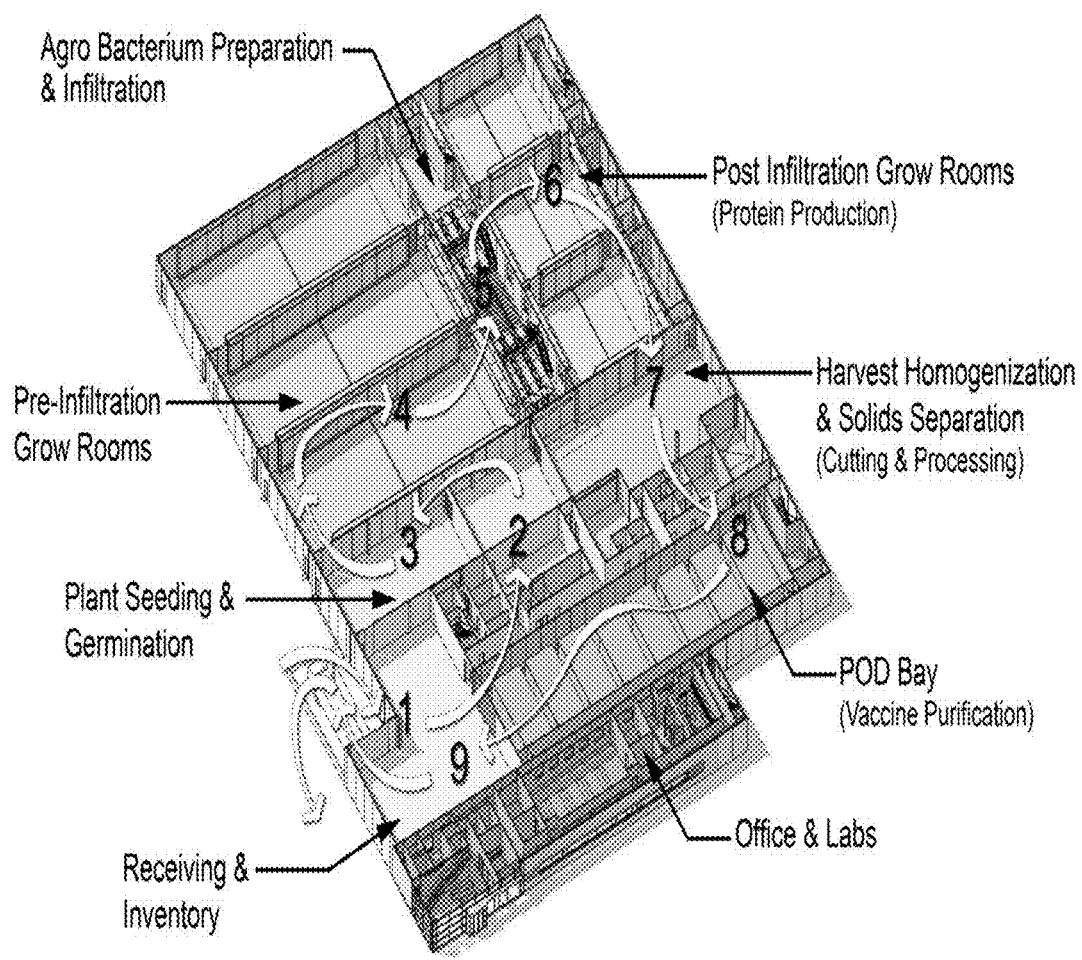
FIG. 7 is a top view of a combination processing facility that include one or more of the modular units of the present invention that includes various components in working communication and that shows an example process flow.
Figure 8:
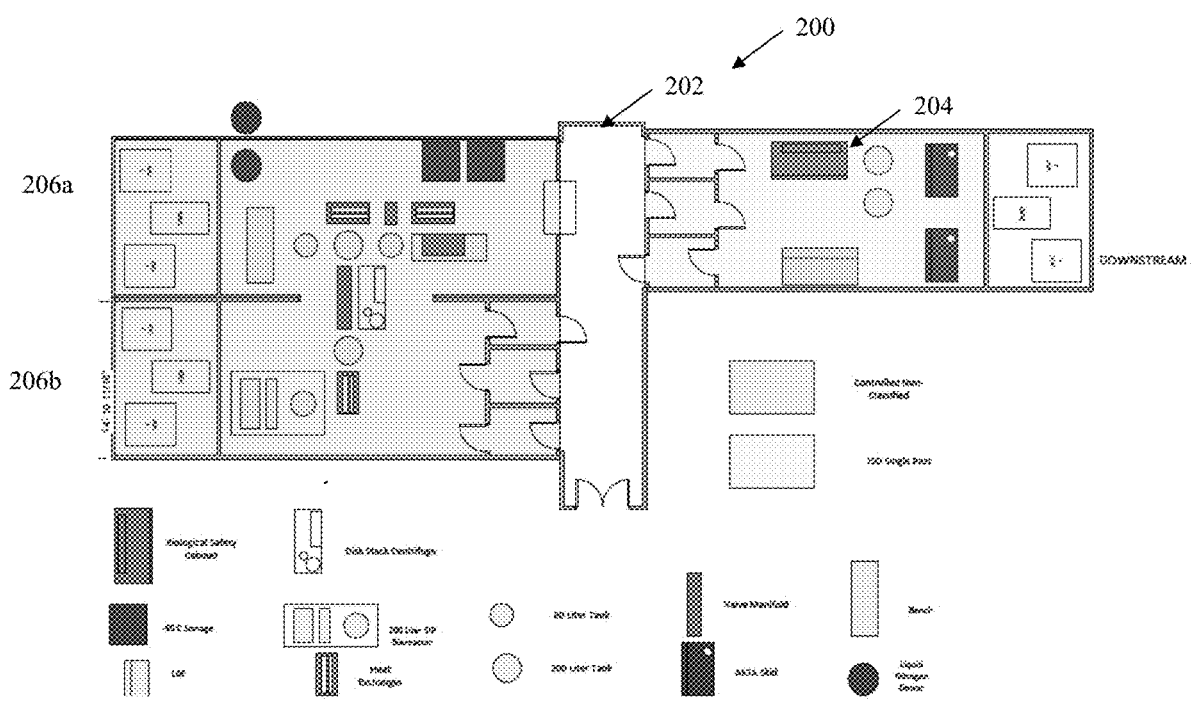
FIG. 8 is another top view of a combination processing facility with three modular units and a common corridor.

The cleanrooms of the present invention can be made with, e.g., monolithic epoxy walls and floors. This provides a very rugged surface and highly cleanable surface for use in Biological Safety Level 3 (BSL3) and Animal Biosafety Level 3 (ABSL3). The clean rooms can be operated in a negative pressure totally isolated mode and when connected to a modular clean hallway. This fact provides at least 3 levels of air cascade essential in BSL3 applications. A new approach has also been designed by the present inventors for an ABSL3 facility that uses the portability of the clean rooms to maximum advantage and a new paradigm. The design is depicted in FIG. 5. The concept is that the animals stay in one place and that services and procedures are brought to them by movable clean rooms. The outer row of cleanrooms represents areas for animals being treated in separate studies.

Services like food supply and waste removal can be facilitated by movable clean rooms. Experimental support services like imaging, surgery, necropsy and others can be brought to the individual experimental animal containment area. The animals can be transferred in containment to the service required and returned if applicable to their habitat clean rooms. This approach allows superior containment for these processes since the animals will not be transported throughout a building to different laboratories for treatment or sophisticated diagnostic and other procedures. Containment is facilitated by a docking system that provides a contained pass through for animals. The pressure can be maintained negatively for both cleanrooms in relation to the gray space. Both clean rooms are isolated from the gray space by filtration on both inlet and exhaust air. The clean rooms can be used as manufacturing or medical facilities for the military. Factories configured by multiple modules can be transported and enable quickly with self-contained power, steam and chilled water service modules.

Filling of antigens at the site of a bioterrorism or biological "hot zone": A mobile clean room can be designed with a sterile filling machine to fill injector tips that are used for air powered injection. This indicates that a clean room could be airlifted to a site of an event and that bulk pharmaceutical substance could be delivered directly from the manufacturer to the site in bulk fill containers containing hundreds of thousands of doses, e.g. 250 ml and 1 mg per ml per ml would yield 2500 doses at 100 micrograms per dose at a dose size of 0.1 ml. The fact that the bulk material could be delivered to the site with no need to fill into individual doses. This could save weeks in the delivery to a "hot zone" since an intermediate fill step would not have to be done.

A specially designed chamber will allow the transfer of waste from the clean room to a sealed portable container for transport of solid and liquid wastes from a process. This container is portable and docks with a dedicated pass through to transfer waste materials. The outer door of the pass through is then closed followed by the inner door on the clean room and the transfer is complete.

The clean rooms of the present invention have been included in a new concept involving up to eight different manufacturing processes can be done in the same gray space infrastructure as depicted in FIGS. 5 and 6. Because of the containment and flexibility multiple processes can be implemented and changed without disturbing other stakeholders in the space.

FIG. 5 is a top view of a complete, comprehensive manufacturing facility 70 that includes manufacturing, processing, packaging, supplies/storage areas, quality control areas, maintenance, decontamination, controlled corridors, finishing and filling pods, locker rooms, mechanical, electrical and other maintenance areas, with some or all being of a modular. The numbered units 1-8 are modular in nature and are shown connected to modular gown-in-gown-out or other like interface areas 72 (e.g., decontamination) that then connect to corridors 74 that can be part of an existing facility or can themselves be modular. Each of the numbered modules 1 to 8 can be connected to other modular units, e.g., an imaging unit 76, surgery/necropsy unit 78, supplies 80, waste 82, water 84, or other modules that can be plugged into the numbered modules based on the design needs for the manufacturing facility 70. Other support areas can be connected to the same that provide office space, restrooms, etc.

FIG. 6 is another top view of a complete, comprehensive biotherapeutics manufacturing facility 100 that includes manufacturing, processing, packaging, supplies/storage areas, quality control areas, maintenance, decontamination, controlled corridors, finishing and filling pods, locker rooms, mechanical, electrical and other maintenance areas, with some or all being of a modular. The various modular units or pods can include, e.g., general basic pod(s) 102, monoclonal antibody pod(s) 104, personalized therapeutic pod(s) units, expansion areas in a controlled "gray" space 110. The units or pod(s) 102, 104, 106, can be connected to one or more modular hallways, e.g., ISO certified hallways 112 and secondary hallways 114, which are shown connected to a single modular gown-in-gown-out and/or locker rooms 116. Each of the modules or pods can then be connected to modular or permanent office areas, quality control areas (e.g., including microbiology) 118, a server room 120, cGMP or other storage areas 122, mechanical room or pod(s) 124, electrical room or pod(s) 126, general maintenance room or pod(s) 128, decontamination area or pod(s) 130, and even a pod(s) fit-up and decontamination area 132 in which pod(s) can be staged and prepared for installation or cleaned following use. Other support areas can be connected to the same that provide office space, restrooms, etc.

FIG. 7 is a top view of a combination processing facility that include one or more of the modular units or pods of the present invention that includes various components in working communication and that shows an example process flow. A receiving and inventor area/pod at step 1 and 9 is shown. The materials are prepared and transferred to a plant seeding and germination area(s)/pod(s) at step 2 and 3, followed by pre-infiltration and grow room(s)/pod(s) at step 4. After the plants are grown in step 4, the processed materials enter, e.g., an agrobacterium preparation and infiltration area(s)/pod(s) at step 5. At step 6, the plants are processed post-infiltration and the plants are grown for, e.g., protein production in the production area(s)/pod(s). At step 7, the plants enter unit(s)/pod(s) used for harvesting, e.g., by homogenization and the solids are separated (cutting and processing). At step 8, the unit(s)/pod(s)pod are used in, e.g., vaccine isolation, purification, filtration, processing, and/or packaging. An adjacent unit or pod can include office, restrooms, lockers, and/or lab space.

FIG. 8 is another top view of a combination processing facility 200 with a common corridor 202, single pod 204 or double pods 206*a* /206*b*.

Cleanroom, containment and isolation systems, modules, and rooms are utilized within the biotechnology, pharmaceutical and semiconductor industries. These systems are interconnected to each other as fixed structure via wall and framing structures, airlocks, doorways etc. The cleanroom and containment structures are built as a whole and not in a component fashion. The invention describes the design and function of prefabricated individual, flexible, mobile and interconnectible components, which assembled or connected together, would create a functional cleanroom, containment or isolation system. The invention furthermore describes the design and structure of these components as complimentary part to an existing structure or traditional containment system, like a cleanroom, containment or isolation area.

Prefabricated modules (FIGS. 9A to 9C) can be either interconnected to an autonomous, functional cleanroom, containment or isolator structure (FIG. 10) or be attached to existing structures (FIG. 11). The prefabricated modules have alignment and connection systems, which creates easy interconnectability between the individual components. The prefabricated modules or components can be of different dimensions, size and materials, depending on the need of the structure/systems they are connected to or the modular unit(s) that are interconnected to each other. Commonly the materials include aluminum framing and wall to be lightweight, however, other materials may be used such as fiberglass, composites, resins and combinations thereof.

Traditional cleanroom structures are firmly interlocked and are not moved, but are fixed in place. These structures are built and designed as fixed structures, not mobile. To modify such structure, one has to tear these apart or disassemble and rebuild. To be able to modify the HVAC system to such fixed structure, one must currently take the ductwork off from the ceiling area, which is connected to an HVAC system or module on top of the traditional cleanroom space or outside of the hosting facility. In addition, the HVAC module may require replacement. Such activities are costly, time-consuming and lead to process interruption as well as re-allocation of resources to monitor and manage the construction effort. In the present invention, when an air handling system is required for such fixed built system, one could add it to the back or sidewall of the fixed cleanroom structure and supply the air into and out of the cleanroom system via the pre-fabricated plenum in FIG. 9A or via the existing ductwork commonly on top of the cleanroom structure. The pre-fabricated plenum can be used in conjunction with the pre-fabricated air handler unit (FIG. 9C) or with another HVAC unit. The pre-fabricated air handler unit comes equipped with air-bearing technology. Modular units can be outfitted with air bearings, so that units can be moved easily into place and can be relocated in near real time to support necessary processes capabilities without disturbing ongoing operations. These units are simply lifted into position (e.g., pushed on air bearings, casters, pallets), connected to a power source and, if necessary, a chilled water, a water and/or a wastewater supply. The individual, prefabricated modules can either be used as modules to be connected to a cleanroom, containment or isolator structure or become part of an existing structure.

Figure 9A:
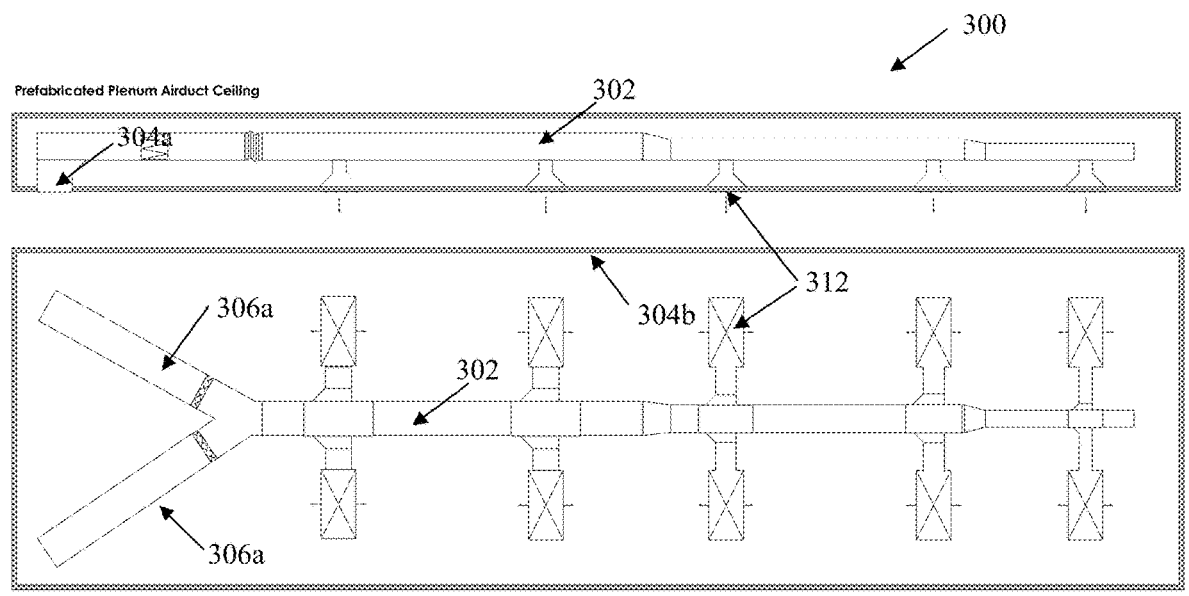
FIG. 9A shows a prefabricated module air supply/return plenum of the present invention.
Figure 9B:
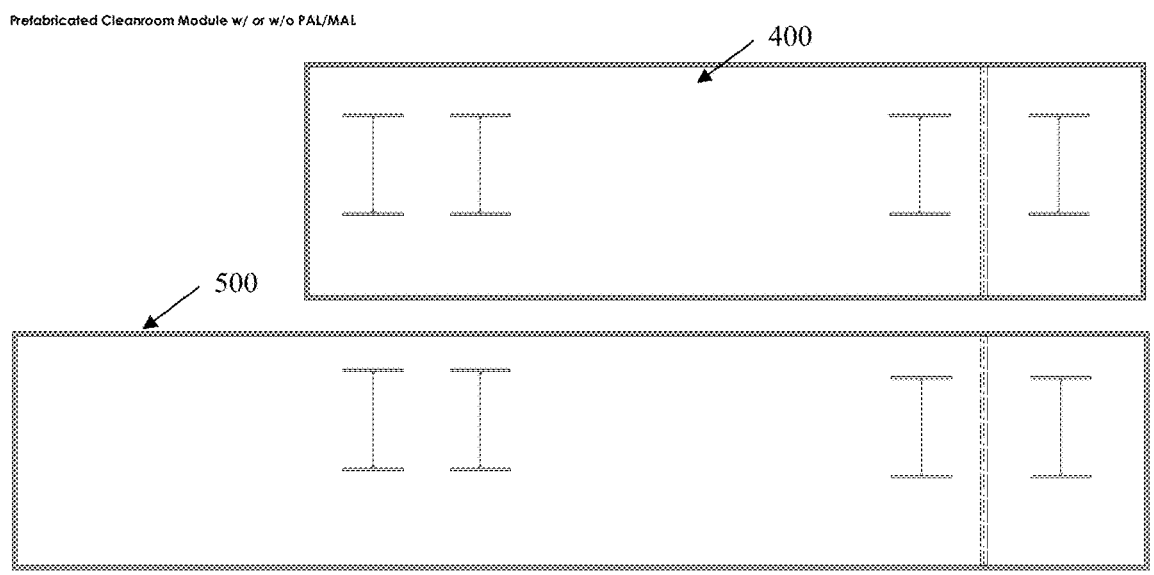
FIG. 9B shows a prefabricated cleanroom/containment module of the present invention.
Figure 9C:
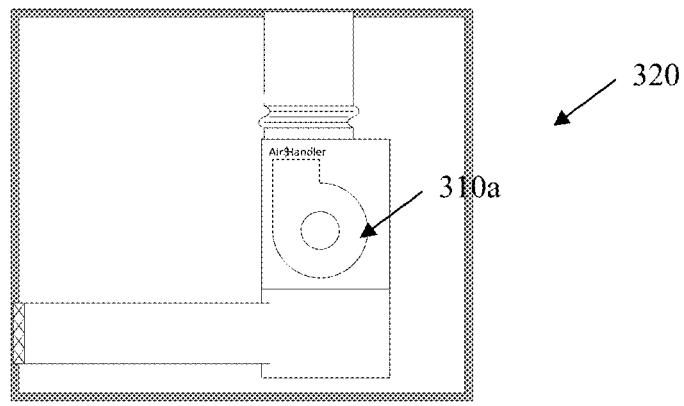
FIG. 9C shows a prefabricated air handler unit of the present invention.
Figure 9C:
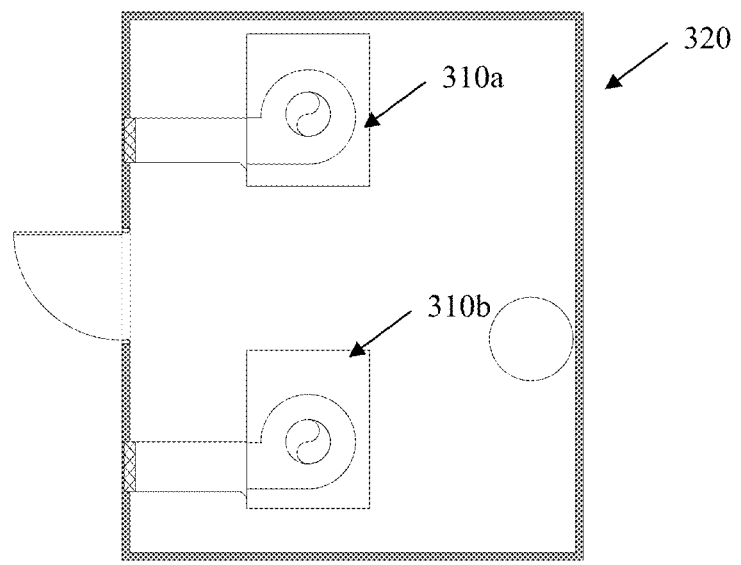

FIG. 9A shows a prefabricated module air supply/return plenum or removable utility unit 300 of the present invention. Briefly, FIG. 9A shows a side and a top view of a removable utility unit 300 for providing one or more utilities to at least one of a controlled air, a sealable, a sterilizable, a sanitizable cleanroom. As shown in the side view, the removable utility unit 300 can include at least one of a utility connection selected from air (shown as conduit 302), water, gas, or electricity; and a substantially hermetic connector 304a between the removable unit and the vent connection and the cleanroom (not shown), and wherein the at least one of air, water, gas, or electricity (not depicted) are connectable to matching utility inputs in the cleanroom can also be hermetically sealed at a single location at or about the air connection or elsewhere along the removable utility unit 300. An alternative type of hermetic seal can be along the perimeter (or within sections or portions of the removable utility unit 300), shown in the lower panel (top view) as hermetic seal 304b. The removable utility unit 300 can also include both hermetic seals 304a and 304b. One distinct advantage of the present invention is that the removable utility unit 300 can be sterilizable or sanitizable separate from the cleanroom. The air utility is provided by first and second air inputs 306a, 306b connectable to two separate heating, ventilation, and air conditioning (HVAC) systems 310a, 310b (see FIG. 9C, which shows a utility room 320, which can also be built separate from the cleanroom and the removable utility unit 300) and first and second inputs into one or more air distribution ventilation shafts, wherein the air distribution ventilation shaft has one or more outlets that direct air into the cleanroom. The air utility can include one or more HVAC systems 310a that further comprise one or more air filtration units that provide at least the air changes necessary to achieve Class A, B, C, D or CNC air purity. The removable utility unit 300 may further include one or more sterilizing or sanitizing units that can be positioned before or after HVAC systems 310a, 310b, or at the vents 312. For example, the sterilizing or sanitizing units can sterilizing, sanitizing or both the entire unit or the internal portions of the air ducts 302, 306a, 306b and/or the conduits for the other utilities (which may be within the air ducts 302, 306a, 306b). Non-limiting examples of sterilizing or sanitizing units or methods include UV unit, an ozonation unit, a hydrogen peroxide, a nitric oxide, chlorine dioxide, or a steam or fog unit (not depicted). The removable utility unit 300 may also include one or more sensors that detect at least one or biological, radiological, particle size and/or count, or chemical contamination within the removable utility unit 300, within the air ducts 302, 306a, 306b and/or the conduits for the other utilities, or both. A non-limiting example of a water utility may provide one or more of potable water, cold water, hot water, pharmaceutical chilled water, water, water-for-injection or deionized water. The hermetic connector attachment (304a, 304b, or both) will generally have a mechanical strength sufficient to permit positive air pressure within the cleanroom without dislodging the removable utility unit. In another non-limiting example, the removable utility unit 300 and the cleanroom are connected the hermetic connector that provides a containment or isolation system sufficient to isolate biosafety level 1, 2, 3, or 4 pathogens. As shown in FIG. 9B, the removable utility units 400, 500 can be further adapted to connect to at least one of an isolation or containment cubicles, pods, modules and units like corridors, hallways, other cleanrooms or access structures by changing the length of the unit to match, e.g., overlapping cleanrooms units, corridors, hallways, other cleanrooms or access structures.

Figure 10:
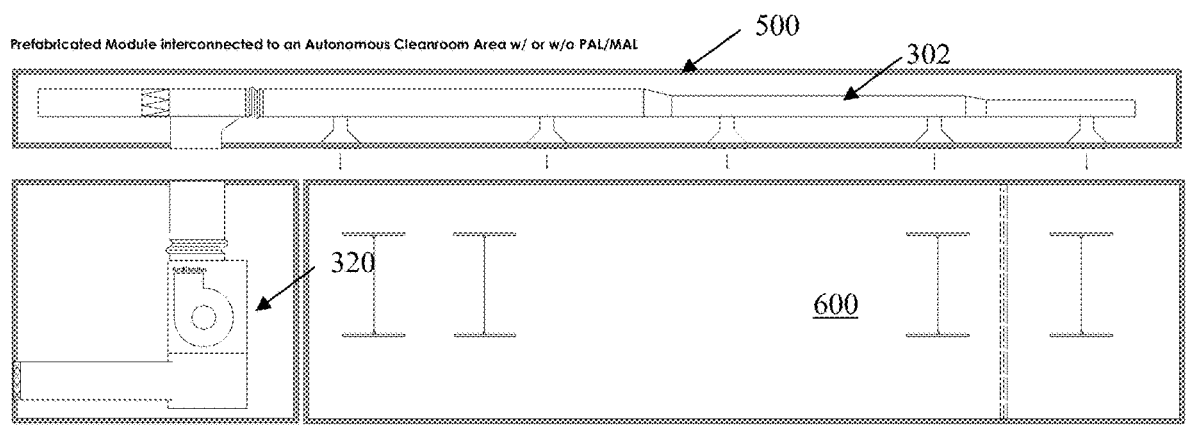
FIG. 10 shows prefabricated modules interconnected to a cleanroom system of the present invention.

FIG. 10 shows a prefabricated, removable utility unit 300 interconnected to a cleanroom 600 and in which the utility room 320 is also assembled separately and removably from the cleanroom 600 and the full-length removable utility unit 500.

Figure 11:
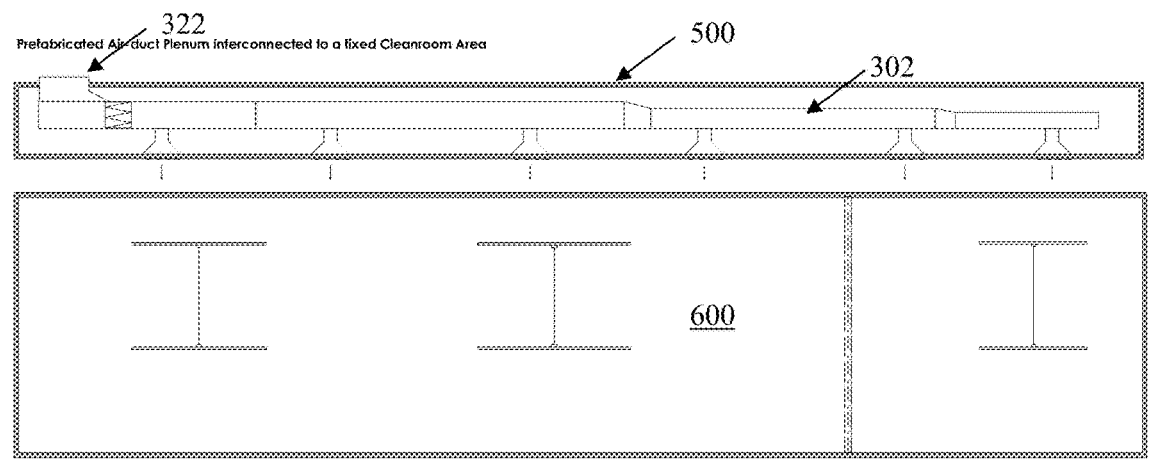
FIG. 11 shows a prefabricated air-duct plenum connected to an existing cleanroom of the present invention.

FIG. 11 shows a prefabricated air-duct plenum 322 is connected to an existing cleanroom 600 of the present invention but in which the air handling ducts 302 are connected to an external source of utilities from prefabricated air-duct plenum 322 and is in the full-length removable utility unit 500.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting" essentially of or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A removable portable utility unit for providing one or more utilities to at least one of a controlled air, a sealable, a sterilizable, a sanitizable portable cleanroom wherein the portable cleanroom is validatable for manufacturing pharmaceuticals or products that require high levels of cleanliness during manufacture, wherein the removable portable utility unit and the portable cleanroom comprises:
    a hermetic seal along a perimeter of a wall of the removable portable utility unit and along a perimeter of a wall of the portable cleanroom that is validatable for manufacturing pharmaceuticals or products that require high levels of cleanliness during manufacture when the wall of the removable portable utility unit is adjacent to and in direct contact with the wall of the portable cleanroom;
    at least one of a utility connection within the removable portable utility unit for a utility selected from air, water, gas, or electricity; and
    a hermetic connector within the removable portable utility unit that connects the removable portable utility unit and the portable cleanroom, wherein the at least one of a utility connection for a utility selected from air, water, gas, or electricity are connectable to matching utility inputs in the portable cleanroom.

2. The removable portable utility unit of claim 1, wherein the removable portable utility unit is at least one of sterilizable or sanitizable separate from the portable cleanroom.

3. The removable portable utility unit of claim 1, wherein the utility connection is an air utility connection that is provided by first and second air inputs connectable to two separate heating, ventilation, and air conditioning (HVAC) systems wherein the first and second air inputs are connected into one or more air distribution ventilation shafts, wherein the air distribution ventilation shafts have one or more outlets that direct air into the portable cleanroom.

4. The removable portable utility unit of claim 1, wherein the utility connection is an air utility connection that includes one or more HVAC systems that further comprise one or more air filtration units that provide at least the air changes necessary to achieve Class A, B, C, D or CNC air purity.

5. The removable portable utility unit of claim 1, wherein the utility connection is an air utility connection that further comprises at least one of one or more sterilizing, sanitizing or both, units selected from a UV unit, an ozonation unit, a hydrogen peroxide, a nitric oxide, chlorine dioxide, a steam or fog unit; or a control panel connected to one or more sensors that detect at least one or biological, radiological, at least one of particle size or count, or chemical contamination.

6. The removable portable utility unit of claim 1, wherein the utility connection is a water utility connection that provides at least one or more of potable water, cold water, hot water, pharmaceutical water, water-for-injection or deionized water.

7. The removable portable utility unit of claim 1, wherein the hermetic connector has a mechanical strength sufficient to permit positive air pressure within the portable cleanroom without dislodging the removable portable utility unit.

8. The removable portable utility unit of claim 1, wherein when the removable portable utility unit and the portable cleanroom are connected the hermetic connector provides a containment or isolation system sufficient to isolate biosafety level 1, 2, 3, or 4 pathogens.

9. The removable portable utility unit of claim 1, wherein the removable portable utility unit can be further adapted to connect to at least one of an isolation or containment cubicles, pods, modules and units like corridors, hallways, other cleanrooms or access structures.

10. A method of providing one or more utilities to at least one of a controlled air, a sealable, a sterilizable, or a sanitizable portable cleanroom wherein the portable cleanroom is validatable for manufacturing pharmaceuticals or products that require high levels of cleanliness during manufacture, wherein the method comprises:
obtaining the portable cleanroom that is validatable for manufacturing pharmaceuticals or products that require high levels of cleanliness during manufacture, the portable cleanroom having air, water, gas, or electricity requirements;
placing a removable portable utility unit adjacent to and in direct contact with the portable cleanroom;
placing a hermetic seal along a perimeter of a wall of the removable portable utility unit and along a perimeter of a wall of the portable cleanroom; and
attaching at least one of a utility connection for a utility selected from air, water, gas, or electricity from within the removable portable utility unit to a hermetic connector between the removable portable utility unit and the portable cleanroom, wherein the at least one of a utility connection for a utility selected from air, water, gas, or electricity are connectable to matching utility inputs in the portable cleanroom.

11. The method of claim 10, wherein the removable portable utility unit is at least one of sterilizable, or sanitizable separate from the portable cleanroom.

12. The method of claim 10, wherein the utility connection is an air utility connection that is provided by first and second air inputs connectable to two separate heating, ventilation, and air conditioning (HVAC) systems wherein the first and second air inputs are connected into one or more air distribution ventilation shafts, wherein the air distribution ventilation shafts have one or more outlets that direct air into the portable cleanroom.

13. The method of claim 10, wherein the utility connection is an air utility connection that includes one or more HVAC systems that further comprise one or more air filtration units that provide the air changes required to achieve at least Class A, B, C, D and CNC air purity.

14. The method of claim 10, wherein the utility connection is an air utility connection that further comprises at least one of one or more sterilizing units selected from a UV unit, an ozonation unit, a hydrogen peroxide, nitric oxide, chlorine dioxide, a steam or fog unit; or a control panel connected to one or more sensors that detect at least one or biological, radiological, at least one of particle size or count, or chemical contamination.

15. The method of claim 10, wherein the utility connection is a water utility connection that provides at least one or more of potable water, cold water, hot water, pharmaceutical water, water-for-injection or deionized water.

16. The method of claim 10, wherein the hermetic connector has a mechanical strength sufficient to permit positive air pressure within the portable cleanroom without dislodging the removable portable utility unit.

17. The method of claim 10, wherein when the removable portable utility unit and the portable cleanroom are connected the hermetic connector is adapted to provide a containment or isolation system sufficient to isolate biosafety level 1, 2, 3, or 4 pathogens.

18. The method of claim 10, wherein the removable portable utility unit can be further adapted to connect to at least one of an isolation or containment cubicles, pods, modules and units like corridors, hallways, other cleanrooms or access structures.

19. A biological processing plant comprising:
two or more portable cleanrooms connected to each other, wherein each of the portable cleanrooms is validatable for manufacturing pharmaceuticals or products that require high levels of cleanliness during manufacture, wherein each of the portable cleanrooms further comprises a removable portable utility unit for providing one or more utilities to the controlled air, sealable, sterilizable portable cleanroom comprising:
a hermetic seal between a perimeter of a wall of the removable portable utility unit and a perimeter of a wall of the portable cleanroom wherein the wall of the removable portable utility unit is adjacent to and in direct contact with the wall of the portable cleanroom;
at least one of a utility connection within the removable portable utility unit for a utility selected from air, water, gas, or electricity; and
a hermetic connector between the removable portable utility unit and the portable cleanroom, wherein the at least one of air, water, gas, or electricity are connectable to matching utility inputs in the portable cleanroom.

20. A removable portable utility room for providing one or more utilities to at least one of a controlled air, a sealable, a sterilizable, a sanitizable portable cleanroom, wherein the portable cleanroom is validatable for manufacturing pharmaceuticals or products that require high levels of cleanliness during manufacture, wherein the one or more utilities are provided through a removable portable utility unit comprising:
a hermetic seal along a perimeter of a wall of the removable portable utility unit and along a perimeter of a wall of the portable cleanroom that is validatable for manufacturing pharmaceuticals or products that require high levels of cleanliness during manufacture;
at least one of a utility connection within the removable portable utility unit selected from air, water, gas, or electricity; and
a hermetic connector between the removable portable utility room, the removable portable utility unit and the portable cleanroom, wherein the at least one of air, water, gas, or electricity are connectable to matching utility inputs in the portable cleanroom from the removable portable utility room.

21. The removable portable utility unit of claim 20, wherein the removable portable utility room is at least one of sterilizable or sanitizable separate from the portable cleanroom.

22. The removable portable utility unit of claim 20, wherein the removable portable utility room includes at least two separate heating, ventilation, and air conditioning (HVAC) systems and first and second inputs into one or more air distribution ventilation shafts, wherein the air distribution ventilation shaft has one or more outlets that direct air into the portable cleanroom.

23. The removable portable utility unit of claim 20, wherein the removable portable utility room includes one or more HVAC systems that further comprise one or more air filtration units that provide at least the air changes necessary to achieve Class A, B, C, D or CNC air purity.

24. The removable portable utility unit of claim 20, wherein the removable portable utility room further comprises at least one of one or more sterilizing, sanitizing or both, units selected from a UV unit, an ozonation unit, a hydrogen peroxide, a nitric oxide, chlorine dioxide, a steam or a fog unit; or one or more sensors that detect at least one or biological, radiological, particle size or chemical contamination.

* * * * *